United States Patent

Okamura

[11] Patent Number: 5,165,380
[45] Date of Patent: Nov. 24, 1992

[54] DISTRIBUTOR WITH A BUILT-IN CRANK ANGLE SENSOR

[75] Inventor: Koichi Okamura, Himeji, Japan

[73] Assignee: Mitsubishi Denki Kabushiki Kaisha, Tokyo, Japan

[21] Appl. No.: 796,796

[22] Filed: Nov. 25, 1991

[30] Foreign Application Priority Data

Nov. 27, 1990 [JP] Japan .................. 2-321169
Nov. 27, 1990 [JP] Japan .................. 2-321170

[51] Int. Cl.⁵ .................................. F02P 7/073
[52] U.S. Cl. ........................ 123/613; 123/146.5 A; 123/647
[58] Field of Search ........ 123/612, 613, 647, 146.5 A

[56] References Cited

U.S. PATENT DOCUMENTS

| | | | |
|---|---|---|---|
| 3,807,378 | 4/1974 | Wernet, Jr. ...................... | 123/613 |
| 3,868,938 | 3/1975 | Trass .............................. | 123/613 |
| 3,931,804 | 1/1976 | Bowen ........................... | 123/613 |
| 4,084,566 | 4/1978 | Weiler ............................ | 123/613 |
| 4,305,371 | 12/1981 | Harada et al. .................. | 123/613 |
| 4,686,953 | 8/1987 | Brown ....................... | 123/613 X |
| 4,747,389 | 5/1988 | Yuzawa et al. ............. | 123/613 X |
| 5,076,249 | 12/1991 | Ikeuchi et al. ................ | 123/613 |

FOREIGN PATENT DOCUMENTS

| | | | |
|---|---|---|---|
| 2752808 | 6/1978 | Fed. Rep. of Germany ...... | 123/613 |
| 1526584 | 9/1978 | United Kingdom ............. | 123/613 |

*Primary Examiner*—Willis R. Wolfe
*Attorney, Agent, or Firm*—Sughrue, Mion, Zinn, Macpeak and Seas

[57] ABSTRACT

A distributor for an automotive engine with a built-in crank angle sensor includes a crank angle sensor unit 7A wherein the photodiode 12 opposing the light emitting diode 11 across the rotation disk 6 and the waveform shaper circuit for shaping the output of the photodiode 12 into a rectangular waveform are built into a single-chip photoreceptive integrated circuit 10. The photoreceptive integrated circuit 10A may include constant current source circuit consisting of a voltage divider 31a and 31b, a operational amplifier 32, a transistor 33, and current detector resistor 34, such that the current level through the light emitting diode 11 is kept constant.

3 Claims, 6 Drawing Sheets

DISTRIBUTOR WITH A BUILT-IN CRANK ANGLE SENSOR

BACKGROUND OF THE INVENTION

This invention relates to distributors with built-in crank angle sensors utilized in controllers of internal combustion engines such as automotive engines, and more particularly to distributors with built-in crank angle sensors which are enhanced in resistance against adverse effects of noises and which are small-sized and reduced in production cost and Controller devices for automotive engines, etc., generally include: a crank angle sensor for generating reference signals corresponding to the reference crank positions of the respective cylinders of the engine, and a distributor for distributing a high ignition voltage to respective cylinders. The crank angle sensor and the distributor are usually attached to the same rotation shaft of the engine such that they form a single distributor unit with a built-in crank angle sensor.

Figure 1:
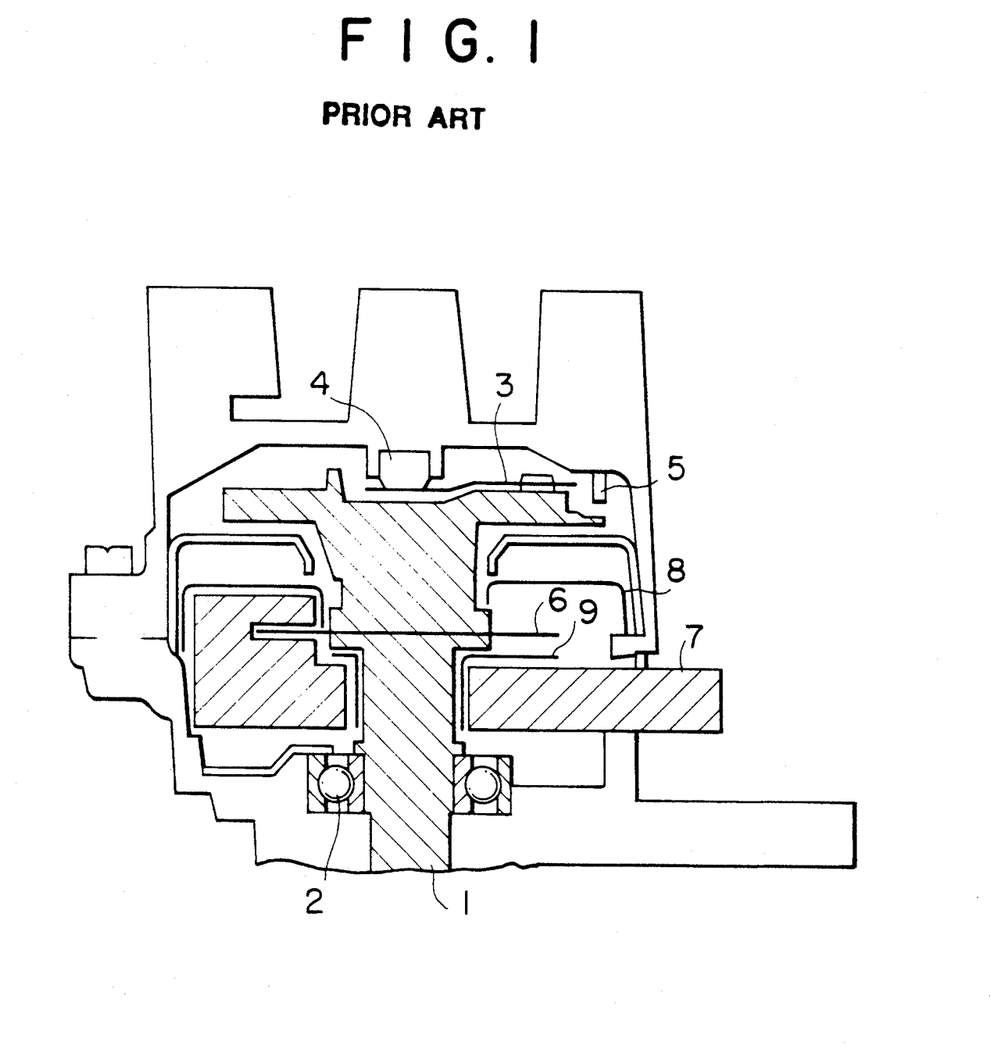
FIG. 1 shows an axial section of a conventional distributor with a built-in crank angle sensor.

FIG. 1 shows an axial section of a conventional distributor with a built-in crank angle sensor.

In FIG. 1, a rotation shaft 1 operatively coupled to the crank shaft of the engine is rotatably supported by a bearing 2. An electrode plate 3 electrically insulated from the rotation shaft 1 is disposed thereabove. A voltage source electrode 4 is in contact with the inner end of the electrode plate 3 to supply a high voltage. Discharge electrodes 5 for respective cylinders oppose the outer end of the electrode plate 3.

A rotation disk 6 has slits formed therethrough corresponding to the crank reference angular positions. A crank angle sensor unit 7 opposes the slits of the rotation disk 6. An electromagnetic shield cover 8 protects the crank angle sensor unit 7 from electromagnetic noises. An electrostatic shield cover 9 protects the crank angle sensor unit 7 from electrostatic noises.

Figure 2:
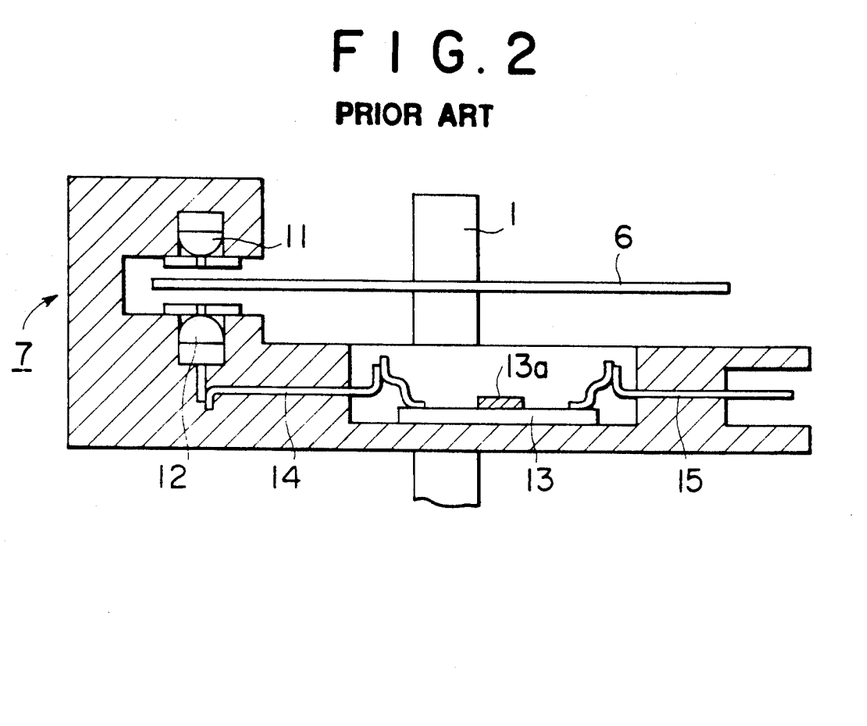
FIG. 2 is an enlarged sectional view of the crank angle sensor unit of FIG. 1.

FIG. 2 is an enlarged sectional view of the crank angle sensor unit of FIG. 1. A light emitting diode 11 and a photoreceptive element, namely a photodiode 12, opposes each other via the rotation disk 6. A hybrid integrated circuit 13 having a monolithic integrated circuit 13a forming part of the circuit thereof is coupled via a lead 14 to the photodiode 12. The output signal of the hybrid integrated circuit 13 is outputted via a lead 15 to the exterior circuit.

Figure 3:
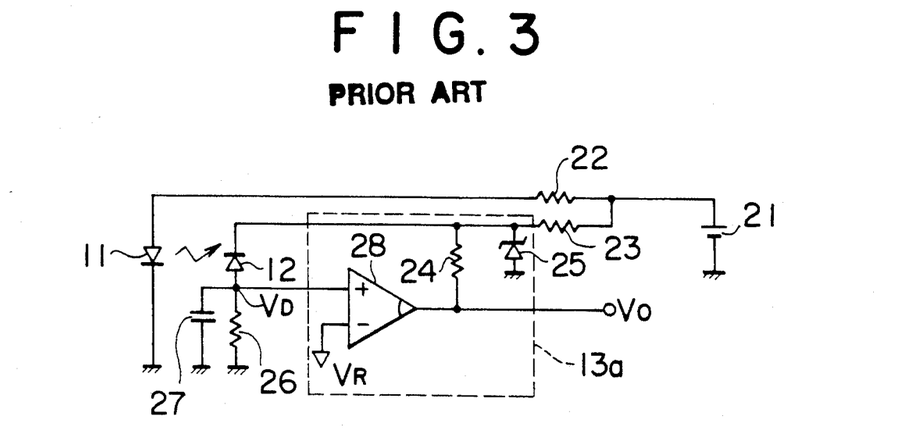
FIG. 3 is a circuit diagram of the hybrid integrated circuit of FIG. 2.

FIG. 3 is a circuit diagram of the hybrid integrated circuit of FIG. 2. Between a DC power source 21 and the light emitting diode 11 is inserted a resistor 22 for driving the light emitting diode 11. Another resistor 23 is inserted across the DC power source 21 and the photodiode 12. The light emitting diode 11 is coupled across the resistor 22 and the ground in the forward polarity.

A pull-up resistor 24 pulls up the output voltage $V_o$ of the hybrid integrated circuit 13. A constant voltage circuit, namely a Zener diode 25, is coupled across the DC power source 21 and the ground via the resistor 23. A load resistor 26 is inserted across the anode of the photodiode 12 and the ground. A capacitor 27 for suppressing the noises is coupled in parallel with the load resistor 26. A comparator 28 compares the voltage $V_D$ at the junction between the photodiode 12 and the load resistor 26 with the reference voltage $V_g$. The cathode of the photodiode 12 is coupled to the cathode of the Zener diode 25. The load resistor 26 and the comparator 28 constitute a waveform shaper circuit for shaping the photoreceptive signal of the photodiode 12 into a rectangular waveform.

The operation of the conventional distributor with a built-in crank angle sensor of FIGS. 1 through 3 is as follows.

Together with the rotation shaft 1, the electrode plate 3 rotates with its inner end contacting the bottom end of the voltage source electrode 4. Thus, the outer end of the electrode plate 3 successively opposes the discharge electrodes 5 for the respective cylinders. Discharge is thus successively generated across the electrode plate 3 and the discharge electrodes 5, and the high ignition voltage is distributed to the respective cylinders.

The light emitting diode 11 is supplied from the DC power source 21 and emits light. The photodiode 12 opposing the light emitting diode 11 via the slits of the rotation disk 6 thus generates a photoreceptive signal which rises and falls at the front and the rear end of the slits, respectively. The hybrid integrated circuit 13 shapes the waveform of the photorecptive signal of the 12 into an output $V_o$ of rectangular waveform, which is supplied to the exterior circuits. Namely, the comparator 28 compares the voltage $V_D$ at the terminal of the load resistor 26 with the reference voltage $V_R$, and thus shapes the photoreceptive signal of the photodiode 12 into an output signal $V_o$ of rectangular waveform.

Thus, the ignition plugs of the respective cylinders are supplied with the high ignition voltage via the discharge electrodes 5 of the distributor. The ignition timings are controlled by the output signal $V_o$ of the hybrid integrated circuit 13.

In the case of the above distributor, the distance from the photodiode 12 to the hybrid integrated circuit 13 is long. Thus, noises are prone to be superposed on the photoreceptive signal. The electromagnetic shield cover 8 made of a magnetic material and an electrically grounded electrostatic shield cover 9 are disposed for the purpose of preventing the noises. Namely, when a discharge is generated across the inner end of the electrode plate 3 and the discharge electrodes 5, electromagnetic noises are generated and superposed on the photoreceptive signal of the photodiode 12. The electromagnetic shield cover 8 prevents these noises. Further, although usually grounded, the rotation shaft 1 may be disconnected from the ground while rotating. Under such circumstances, a high voltage of the distributor is induced on the rotation shaft 1. Thus, the high voltage of the rotation shaft 1 is superposed on the photoreceptive signal as the electrostatic noises. The electrostatic shield cover 9 prevents these noises.

However, the photoreceptive signal of the photodiode 12 is weak. Further, the connection of the photodiode 12 with the load resistor 26 disposed on the hybrid integrated circuit 13 is effected via the lead 14, which exhibits a substantial area compared with the electrical connection pattern on the integrated circuit. Thus, noises are extremely prone to be superposed on the photoreceptive signal, and it is difficult to prevent these noises completely. If the input voltage $V_D$ to the hybrid integrated circuit 13 exceeds the reference voltage $V_R$ due to the superposed noises, the comparator 28 functions erroneously. The reliability of the ignition control is thus reduced.

Further, since the resistance to noises of the crank angle sensor unit 7 is small, the distance between the distributor portion and the crank angle sensor unit 7 cannot be reduced without adverse effects. This presents an impediment to the reduction of the size of the distributor as a whole.

SUMMARY OF THE INVENTION

It is therefore an object of this invention to provide a distributor with a built-in crank angle sensor which is resistant against noises, enhanced in reliability, small in size and reduced in cost.

The above object is accomplished in accordance with the principle of this invention by a distributor with a built-in crank angle sensor comprising: a distributor unit having a rotation shaft operatively coupled to a crank shaft of an internal combustion engine; a rotation disk attached to said rotation shaft of said distributor unit and having a plurality of slits formed therethrough in correspondence with reference positions of said crank shaft; a light emitting diode opposing a side of said rotation disk to oppose said slits successively when said rotation disk rotates; a photoreceptive integrated circuit consisting of a single silicon chip and including: a photodiode opposing said light emitting diode via said rotation disk; and waveform shaper circuit coupled to an output of said photodiode for shaping the output of said photodiode into a rectangular waveform.

Preferably, said photoreceptive integrated circuit further includes a constant current circuit for supplying a constant current to said light emitting diode. Further preferably, said constant current circuit includes: means for providing a reference voltage; a transistor coupled in series with said light emitting diode; a current detector resistor coupled in series with said transistor, a terminal of said current detector resistor developing a voltage corresponding to a current level flowing through said light emitting diode; and an operational amplifier having a non-inverting input terminal coupled to said reference voltage and an inverting input terminal coupled to said terminal of said current detector resistor, the output of said operational amplifier being coupled to the base of said transistor.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

In the drawing, like reference numerals represent like or corresponding parts or portions.

DETAILED DESCRIPTION OF THE PREFERRED EMBODIMENTS

Referring now to the accompanying drawings, the preferred embodiments of this invention are described.

Figure 4:
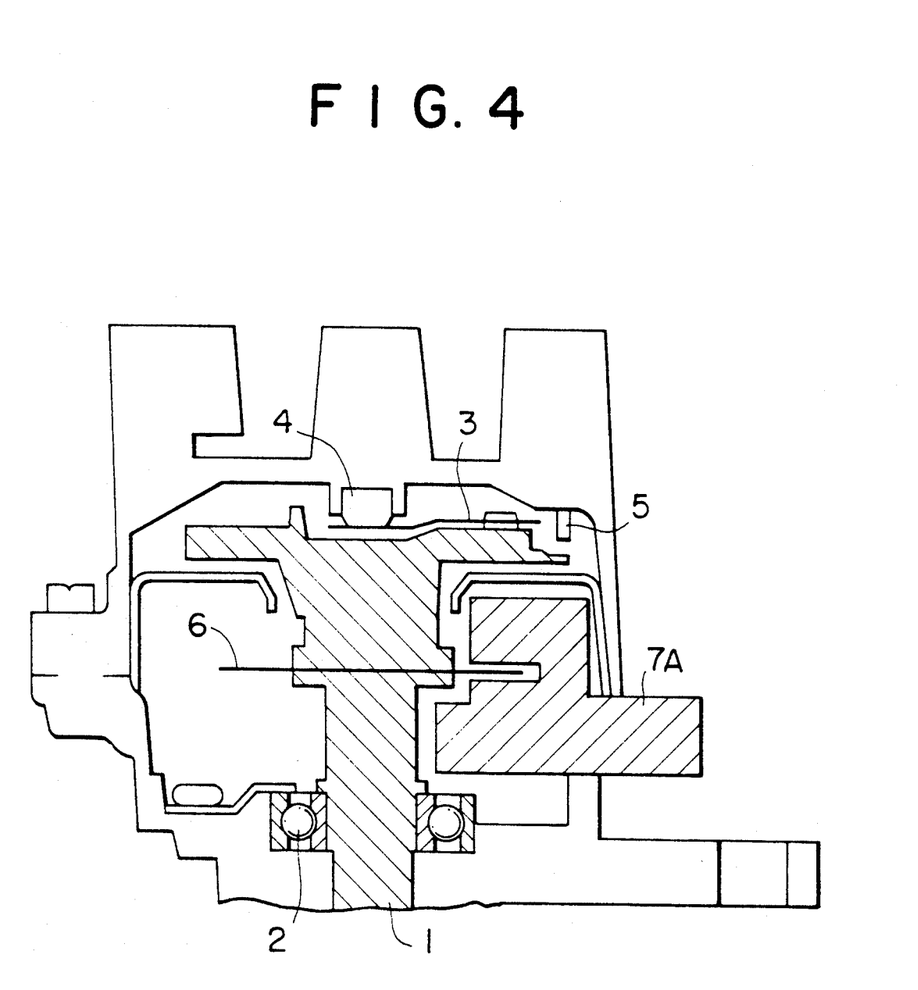
FIG. 4 shows an axial section of a distributor with a built-in crank angle sensor according to this invention.
Figure 5:
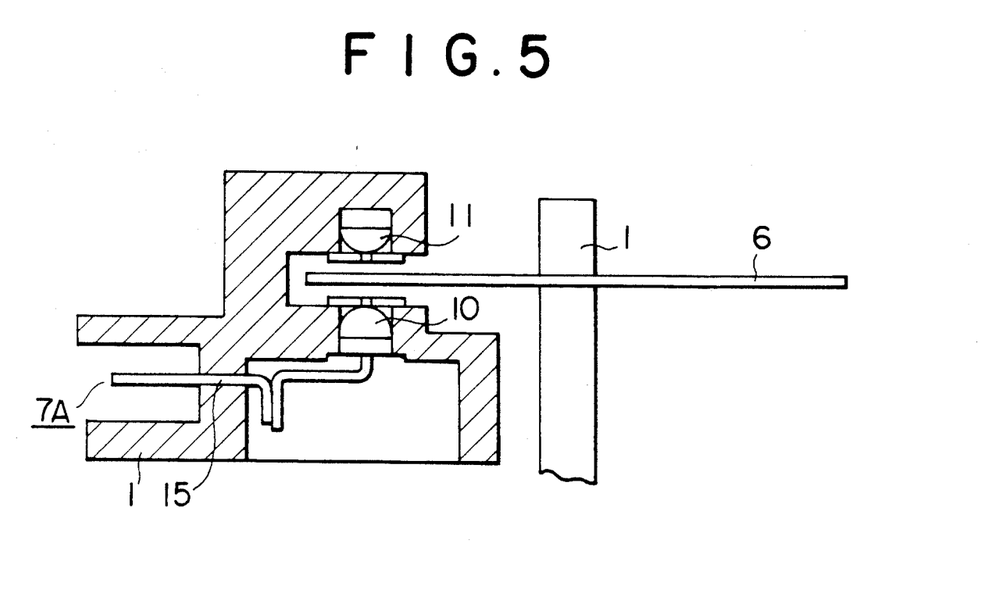
FIG. 5 is an enlarged sectional view of the crank angle sensor unit of FIG. 4.
Figure 6:
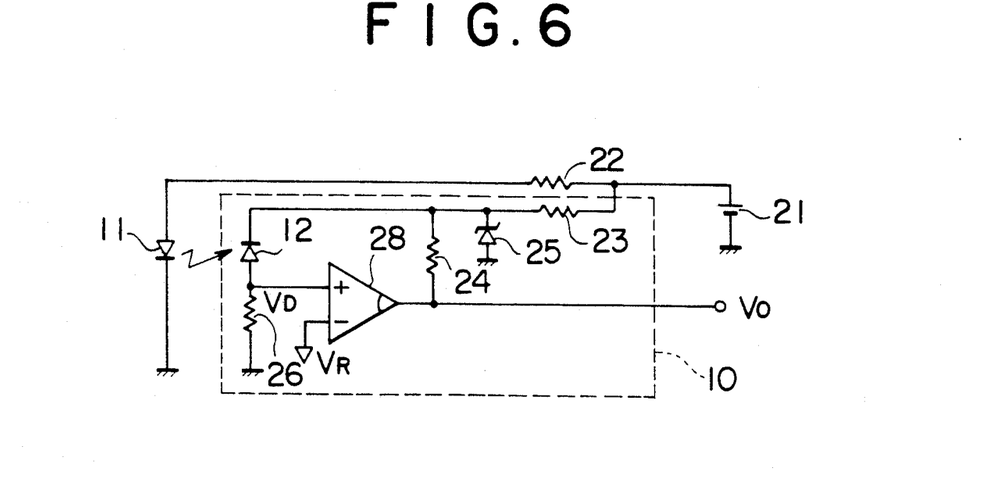
FIG. 6 is a circuit diagram of the photoreceptive integrated circuit of FIG. 5.

FIG. 4 shows an axial section of a distributor with a built-in crank angle sensor according to this invention. FIG. 5 is an enlarged sectional view of the crank angle sensor unit of FIG. 4, and FIG. 6 is a circuit diagram of the photoreceptive integrated circuit of FIG. 5, wherein the crank angle sensor unit 7A corresponds to the crank angle sensor unit 7 of FIG. 1. The parts 1 through 6, 11, 12, 15, 21 through 26 and 28 are similar to those of FIGS. 1 through 3 described above.

Thus, the distribution of the high ignition voltage and the generation of the output signal $V_o$ are effected as in the case of the device of FIGS. 1 through 3. However, the photodiode 12 is mounted integrally on a single-chip photoreceptive integrated circuit 10, and hence the electromagnetic shield cover 8, the electrostatic shield cover 9 and the capacitor 27 for suppressing the noises are dispensed with.

Namely, the lead for connecting the photodiode 12 with the comparator 28 is disposed on an integrated circuit chip and hence is rendered extremely thin. Thus, the resistance against noises and the reliability are substantially enhanced. Further, the distance between the distributor and the crank angle sensor unit 7A is minimized. Thus, as is apparent from FIG. 4, the distributor as a whole is rendered smaller and hence less expensive. Furthermore, the photoreceptive integrated circuit 10 generates a highly reliable output signal $V_O$.

Figure 7:
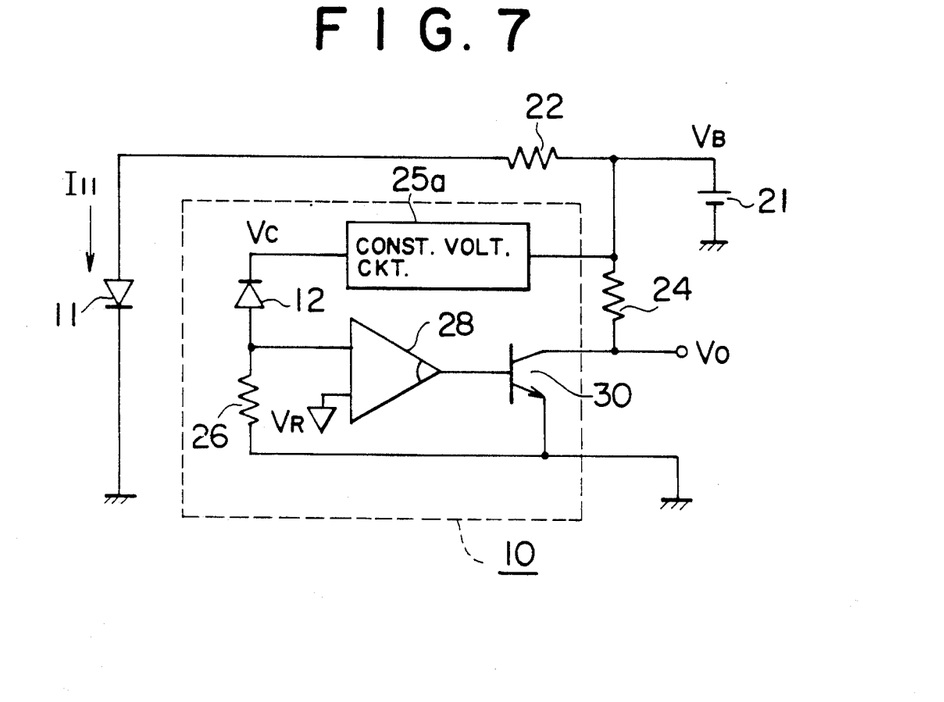
FIG. 7 is a circuit diagram of another photoreceptive integrated circuit by which the photodiode and constant voltage circuit are integrated on a single integrated circuit chip.

FIG. 7 is a circuit diagram of another photoreceptive integrated circuit by which the photodiode and constant voltage circuit are integrated on a single integrated circuit chip. In FIG. 7, a DC power source 21 generates a DC voltage $V_B$. A resistor 22 for driving a light emitting diode 11 is inserted between the DC power source 21 and the light emitting diode 11. The light emitting diode 11 is coupled across the resistor 22 and the ground in the forward polarity. A pull-up resistor 24 pulls up the output voltage $V_O$ of the photoreceptive integrated circuit 10.

The photoreceptive integrated circuit 10 includes: a constant voltage circuit 25a coupled to the DC power source 21; a photodiode 12, or a photoreceptive element, coupled to the constant voltage circuit 25a load resistor 26 coupled across the anode of the photodiode 12 and the ground; a comparator 28 for comparing the voltage at the junction between the photodiode 12 and the load resistor 26 with a reference voltage $V_R$; and an output transistor 30 having a base coupled to the output terminal of the comparator 28, a collector coupled to the pull-up resistor 24, and an emitter coupled to the ground. The load resistor 26, the comparator 28, and the output transistor 30 constitute a waveform shaper circuit for shaping the photoreceptive signal of the photodiode 12 into a rectangular signal.

The operation of the photoreceptive integrated circuit of FIG. 7 is as follows. Usually, the DC voltage $V_B$ from the DC power source 21 is applied to the light emitting diode 11 via the resistor 22, such that a current $I_{11}$ flows through the light emitting diode 11. Thus, the light emitting diode 11 continuously emits light.

The photodiode 12 within the photoreceptive integrated circuit 10 opposes the light emitting diode 11 across the rotating slits of the rotation disk. Thus, when the light from the light emitting diode 11 is incident thereon through the slits of the rotation disk, the photodiode 12 generates a current and develops a voltage across the two terminals of the load resistor 26. When the light from the light emitting diode 11 is interrupted by the solid portion between the slits, the photodiode 12 does not allow any current to flow therethrough, and hence the voltage across the two terminals of the load resistor 26 is reduced to null.

The comparator 28 compares the voltage across the two terminals of the load resistor 26 with the reference voltage $V_R$, and thereby shapes the photoreceptive signal from the photodiode 12 into a pulse-shaped rectangular signal, which then drives the output transistor 30. Thus, the output signal $V_O$ of the photoreceptive integrated circuit 10 has an inverted waveform with respect to the photoreceptive signal. Namely, when the output transistor 30 is turned on by the high level of the photoreceptive signal, the output of the photoreceptive integrated circuit 10 is at the ground level. When, on the other hand, the output transistor 30 is turned off, it is at the source voltage level $V_B$. Thus, the output signal $V_O$ falls from the high to the low level at the first reference angular positions of the crank shaft, and rises from the low to the high level at the second reference positions of the crank shaft.

The circuit of FIG. 2 has the following disadvantage. Namely, since the variation of the voltage $V_B$ of the DC power source 21 affects the level of current $I_{11}$ through the light emitting diode 11. Thus, the reliability of the output voltage $V_O$ is reduced. Further, when the forward voltage of the light emitting diode 11 is represented by $V_F$, and the resistance of the resistor 29 by $R_{29}$, then, the current $I_{11}$ is given by:

$$I_{11} = (V_B - V_F)/R_{29}$$

from which it is known that the current $I_{11}$ flowing through the light emitting diode 11 depends not only on the source voltage $V_B$, but also on the production dispersion of the forward voltage $V_F$ of the light emitting diode 11. (The forward voltage of the light emitting diode 11 may vary from one to another due to production dispersion.)

Figure 8:
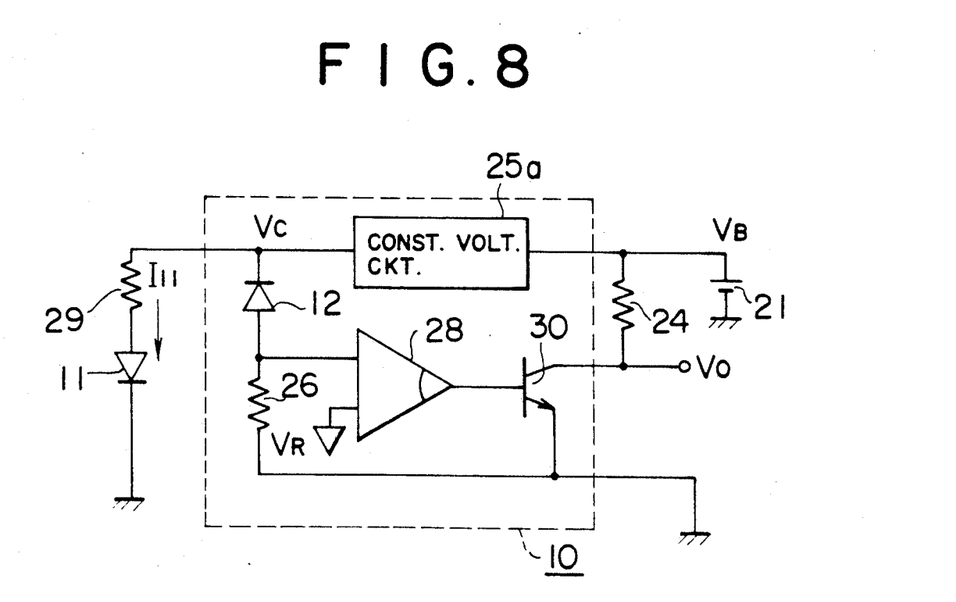
FIG. 8 is a circuit diagram of still another photoreceptive integrated circuit by which the photodiode and constant voltage circuit are integrated on a single integrated circuit chip.

FIG. 8 is a circuit diagram of still another photoreceptive integrated circuit by which the photodiode and constant voltage circuit are integrated on a single integrated circuit chip. In FIG. 8, a resistor 29 is inserted between the constant voltage circuit 25a and the cathode of the photodiode 12, such that the voltage from the constant voltage circuit 25a is supplied via the resistor 29 to the light emitting diode 11. However, in the case of this circuit, the current $I_{11}$ through the light emitting diode 11 is represented by:

$$I_{11} = (V_C - V_F)/R_{29}$$

where $V_C$ is the voltage provided by the constant voltage circuit 25a.

Thus, although the dependency of the current $I_{11}$ on the variation of the source voltage $V_B$ is eliminated, the current $I_{11}$ flowing through the light emitting diode 11 is still affected by the dispersion of the forward voltage $V_F$ of the light emitting diode 11. In particular, since a plurality of light emitting diodes are connected serially in the actual implementation of the crank angle sensor for an automotive engine, the dispersion of the light emitting diode 11 substantially affects the level of the current through light emitting diode 11, and thereby reduces the stability of the output voltage $V_O$ of the photoreceptive integrated circuit 10.

Figure 9:
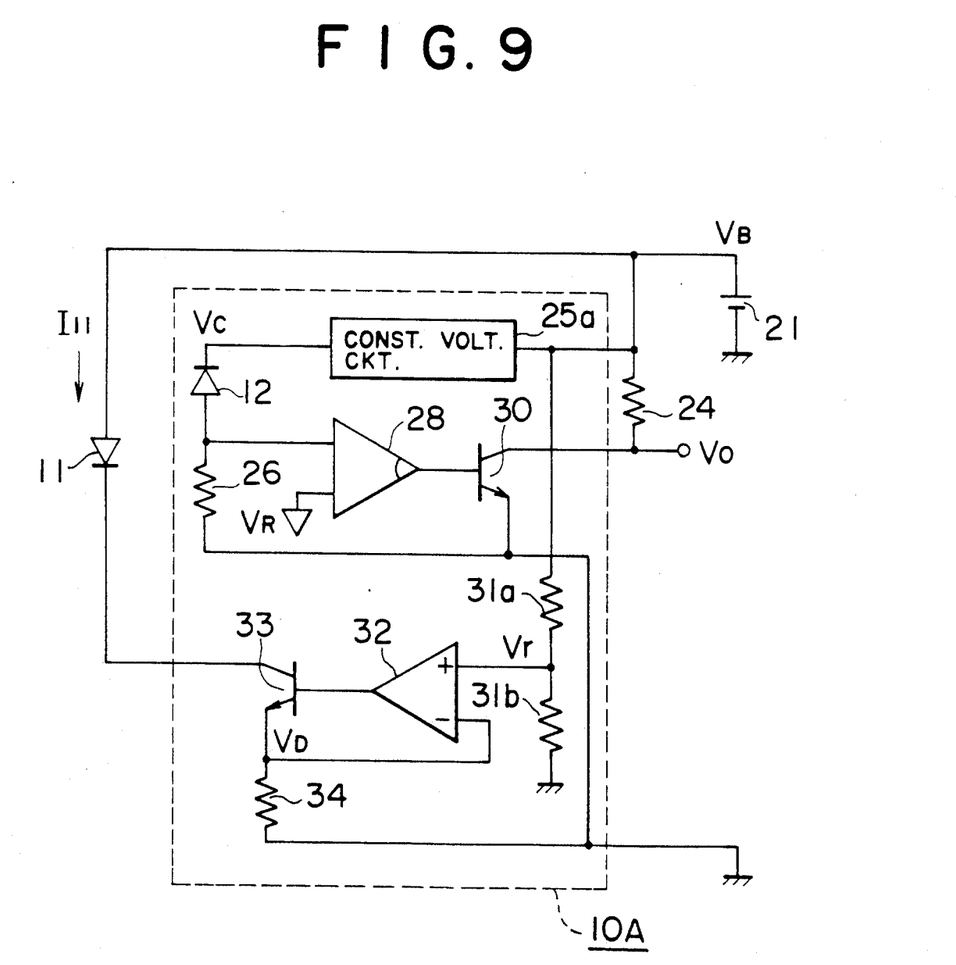
FIG. 9 is a circuit diagram of a photoreceptive integrated circuit according to this invention by which the photodiode and constant voltage circuit are integrated on a single integrated circuit chip and which includes a constant current source.

FIG. 9 is a circuit diagram of a photoreceptive integrated circuit according to this invention by which the photodiode and constant voltage circuit are integrated on a single integrated circuit chip and which includes a constant current source. In FIG. 9, the photoreceptive integrated circuit 10A corresponds to the photoreceptive integrated circuit 10, and the parts 11, 12, 21, 24, 25a, 26, 28, and 30 are similar to those of FIGS. 7 and 8.

Further, the voltage divider consisting of the resistors 31a and 31b is inserted across the DC power source 21 and the ground. The junction point of the resistors 31a and 31b thus provides a reference voltage Vr. The reference voltage Vr is applied to the non-inverting input terminal of a operational amplifier 32. The output of the operational amplifier 32 is coupled to the base of the transistor 33, whose emitter is coupled to the inverting input terminal of the operational amplifier 32. The collector of the transistor 33 is coupled to the cathode of the light emitting diode 11.

A current detector resistor 34 for detecting the current through the light emitting diode 11 is coupled across the emitter of the transistor 33 and the ground. The voltage $V_D$ at a terminal of the current detector resistor 34 corresponding to the detection current is applied to the inverting input terminal of the operational amplifier 32.

The voltage divider 31a and 31b, the operational amplifier 32, the transistor 33, and the current detector resistor 34 constitute a constant current circuit for driving the light emitting diode 11 at a constant current level.

Next, the operation of the circuit of FIG. 9 is described. The generation of the output signal $V_O$ is effected in a manner similar to that of the circuits of FIGS. 7 and 8.

When the source voltage $V_B$ is applied to the light emitting diode 11, a corresponding current $I_{11}$ flows therethrough. The current $I_{11}$ through the light emitting diode 11 is detected via the current detector resistor 34, and the voltage $V_D$ at the terminal thereof is applied to the inverting input terminal of the operational amplifier 32. The operational amplifier 32 thus outputs a voltage corresponding to the difference between the voltage $V_D$ from the current detector resistor 34 and the reference voltage Vr. The output of the operational amplifier 32 drives the transistor 33.

Thus, when the resistance of the current detector resistor 34 is represented by $R_{34}$, the current $I_{11}$ through the light emitting diode 11 is given by:

$$I_{11} = Vr/R_{34} \qquad (1)$$

where Vr is:

$$Vr = V_C \cdot R_B/R_A$$

$R_A$ being the sum of the resistances of the resistors 31a and 31b and $R_B$ being the resistances of the resistors 31b.

Since the dispersion of the resistance values is negligibly small, it is concluded from equation (1) that the current $I_{11}$ through the light emitting diode 11 is not affected by the dispersion of the forward voltage $V_F$ of the light emitting diode 11 and hence is stabilized. Further, since the external elements such as the resistor 22 can be dispensed with, the size of the circuit can further be reduced, while enhancing the reliability of the output signal $V_O$.

What is claimed is:

1. A distributor with a built-in crank angle sensor for an internal combustion engine, comprising:
    a distributor unit having a rotation shaft operatively coupled to a crank shaft of an internal combustion engine;
    a rotation disk attached to said rotation shaft of said distributor unit and having a plurality of slits formed therethrough in correspondence with reference positions of said crank shaft;
    a light emitting diode opposing a side of said rotation disk to oppose said slits successively when said rotation disk rotates;
    a photoreceptive integrated circuit consisting of a single silicon chip and including: a photodiode opposing said light emitting diode via said rotation disk; and waveform shaper circuit coupled to an output of said photodiode for shaping the output of said photodiode into a rectangular waveform.

2. A distributor with a built-in crank angle sensor as claimed in claim 1, wherein: said photoreceptive integrated circuit further includes a constant current circuit for supplying a constant current to said light emitting diode.

3. A distributor with a built-in crank angle sensor as claimed in claim 2, wherein said constant current circuit includes: means for providing a reference voltage; a transistor coupled in series with said light emitting diode; a current detector resistor coupled in series with said transistor, a terminal of said current detector resistor developing a voltage corresponding to a current level flowing through said light emitting diode; and an operational amplifier having a non-inverting input terminal coupled to said reference voltage and an inverting input terminal coupled to said terminal of said current detector resistor, an output of said operational amplifier being coupled to a base of said transistor.

* * * * *